United States Patent
Lassota et al.

(10) Patent No.: US 7,735,691 B1
(45) Date of Patent: *Jun. 15, 2010

(54) BEVERAGE DISPENSER WITH REINFORCED METAL DOUBLE-WALLED HOUSING

(75) Inventors: Zbigniew G. Lassota, Long Grove, IL (US); Christopher J. Wierzbicki, Chicago, IL (US)

(73) Assignee: Food Equipment Technologies Company, Inc., Lake Zurich, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/990,644

(22) Filed: Nov. 17, 2004

Related U.S. Application Data

(60) Division of application No. 10/118,684, filed on Apr. 9, 2002, now Pat. No. 6,840,407, which is a continuation-in-part of application No. 09/931,687, filed on Aug. 16, 2001, now Pat. No. 6,741,180, and a continuation-in-part of application No. 09/932,572, filed on Aug. 16, 2001, now Pat. No. 6,702,153, and a continuation-in-part of application No. 09/932,562, filed on Aug. 16, 2001, now Pat. No. 6,619,507, and a continuation-in-part of application No. 09/930,923, filed on Aug. 16, 2001, now Pat. No. 6,708,598.

(51) Int. Cl.
*B67D 7/06* (2010.01)

(52) U.S. Cl. .................. 222/183; 220/592.19

(58) Field of Classification Search ............. 222/181.1, 222/181.2, 183, 184, 185.1, 462, 173, 523; 220/592.03, 592.02, 592.16–592.19, 586, 220/62.11

See application file for complete search history.

(56) References Cited

U.S. PATENT DOCUMENTS

| | | | | | |
|---|---|---|---|---|---|
| 5,129,534 | A | * | 7/1992 | Dunn | 220/4.33 |
| 5,222,631 | A | * | 6/1993 | Hood | 222/131 |
| 5,613,622 | A | * | 3/1997 | Surrena et al. | 222/105 |
| 5,636,766 | A | * | 6/1997 | Delameter et al. | 222/183 |
| 5,692,631 | A | * | 12/1997 | Tillard et al. | 220/4.12 |
| 5,782,381 | A | * | 7/1998 | Woodruff et al. | 222/23 |
| 5,968,618 | A | * | 10/1999 | Miller | 428/34.6 |
| 6,840,407 | B2 | * | 1/2005 | Lassota et al. | 222/183 |

FOREIGN PATENT DOCUMENTS

| | | | | |
|---|---|---|---|---|
| JP | 59-193259 | * | 11/1984 | 220/560.1 |
| JP | 4-114614 | * | 4/1992 | 222/185.1 |
| JP | 4-135521 | * | 5/1992 | 220/560.1 |
| JP | 6-183466 | * | 7/1994 | 222/185.1 |
| JP | 7-27430 | * | 5/1995 | 220/560.1 |
| JP | 11-227764 | * | 8/1999 | 222/185.1 |

* cited by examiner

*Primary Examiner*—Lien T Ngo
(74) *Attorney, Agent, or Firm*—James W. Potthast; Potthast & Associates

(57) ABSTRACT

An insulated beverage dispenser (10) with an outer housing (24) having reinforcing cavities (86) and reinforcing ribs (88) on a canted surface (92) of a top closure (78) with a peripheral edge that is sealed to a cylindrical outer housing body, and a cylindrical reinforcing collar to resist distortion that is fitted over an integrally formed inner liner (48) in spaced relationship to provide a gap (52) that is evacuated to approximately 8%.

12 Claims, 5 Drawing Sheets

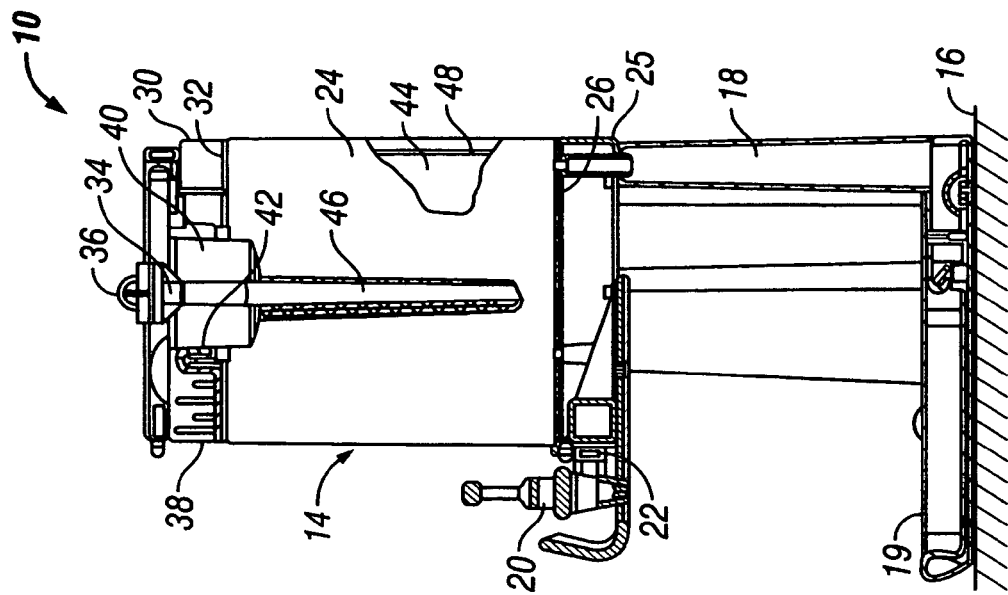
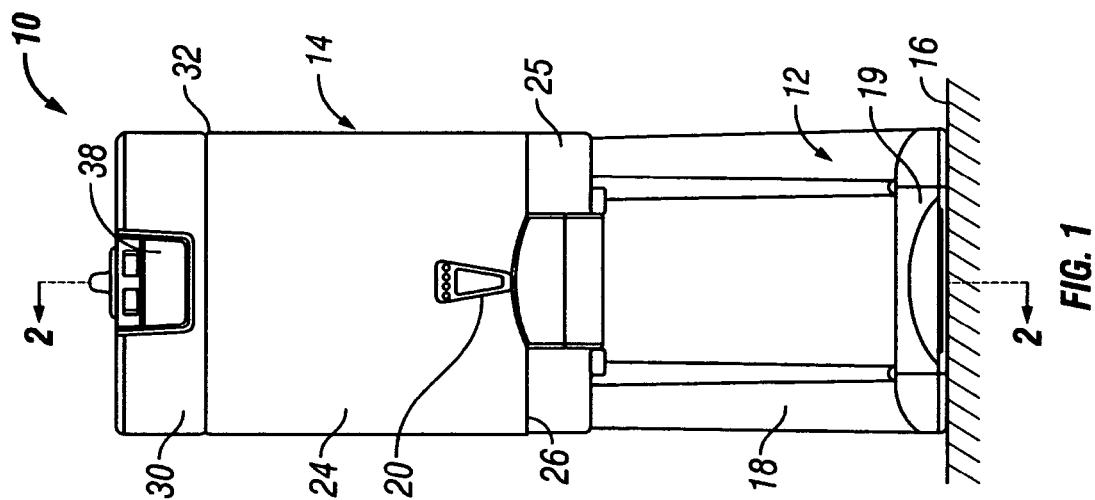

BEVERAGE DISPENSER WITH REINFORCED METAL DOUBLE-WALLED HOUSING

CROSS REFERENCE TO RELATED APPLICATION

This application is a division of, and claims the benefit under 35 USC 120 of, application Ser. No. 10/118,684, filed Apr. 9, 2002 now U.S. Pat. No. 6,840,407, which, in turn, is a continuation-in-part of, and claims the benefit under 35 USC 120 of U.S. application Ser. Nos. 09/931,687, now U.S. Pat. No. 6,741,180, entitled "Beverage Dispensing Urn with Electronic Display", Ser. No. 09/932,572, now U.S. Pat. No. 6,702,153, entitled "Beverage Dispenser with Faucet Assembly", Ser. No. 09/932,562, now U.S. Pat. No. 6,619,507, entitled "Beverage Dispenser with Drip Tray Assembly and Method", Ser. No. 09/930,923, now U.S. Pat. No. 6,708,598, entitled "Beverage Dispenser with Cover Assembly and Method", all filed Aug. 16, 2001, and all having the same inventor as the present invention.

BACKGROUND OF THE INVENTION

1. Field of the Invention

This invention generally relates to beverage dispensers, more particularly, to insulated beverage dispensers and methods of making same.

2. Discussion of the Prior Art

It is known to provide commercial beverage dispensers with a double walled construction in which an outer, usually stainless steel housing surrounds and protects an inner liner, also made of steel, or made of glass. In the case of a glass liner, the liner has a mirrored surface to block passage of infrared radiation and conductive heat is blocked by foam insulation or other insulation between the outside of the liner and the inside of an outer housing that envelopes the glass liner. Likewise, if the liner is made of steel which is more robust than glass but which is also a good conductor of heat, it is necessary to provide solid foam insulation, such as cyanurethane or other like foam-type insulation. A problem with some dispensers using metal liners is that over time water may leak into the interior space between the outer housing and the inner liner and wet the solid foam insulation material. When this occurs the solid insulation material looses its insulating properties or these properties are overcome by the noninsulating, thermally conductive properties of the water.

While it is known in unrelated areas that vacuum is highly insulating, and so-called vacuum bottles are known, it has not been known to provide a commercial vacuum insulated beverage dispenser, due to the excessive pressures that are created that cause the component elements to distort, break or otherwise lose vacuum integrity when constructed of the usual thin wall materials needed for economy and weight reduction.

The inventor have therefore determined that there is a need for a vacuum insulated beverage dispenser design and method of making a vacuum insulated beverage dispenser that overcomes the shortcoming of known designs of insulated beverage dispensers.

SUMMARY OF THE INVENTION

It is therefore the general object of the invention to provide a vacuum insulated beverage dispenser that is insulated, at least in significant part, by a vacuum located in a gap between an inner liner and an outer housing of the beverage dispenser and a method of making a vacuum insulated beverage dispenser with sufficient strength to withstand the pressures and other forces created by the vacuum and general usage.

This objective is achieved in part by providing a vacuum insulated beverage dispenser with an inner liner having a generally tubular liner body, a closed bottom closure and a top closure with an inlet opening, an outer housing with a tubular housing body that envelopes the tubular body of the inner liner, a relatively larger closed bottom closure and a relatively larger top closure with a housing top opening generally aligned with the inlet opening, said outer housing body enveloping the inner cylindrical liner in spaced relationship to form an evacuated gap between the tubular bodies, the closed bottom closures and the top closures and a surface of said top closure of the outer housing body extending between the top opening of the outer housing to a surrounding outer edge of the surface joined to the tubular housing body at a location adjacent to but spaced beneath the top end of the tubular housing body to strengthen the top closures against distortion from net pressure created by evacuation of the evacuated gap.

Moreover, the objective is also achieved in part by providing an insulated beverage dispenser, comprising an inner liner with a generally tubular liner body, a bottom closure and a top closure with an inlet opening and an outer housing with a tubular housing body that envelopes the tubular body of the inner liner, a relatively larger closed bottom closure and a relatively larger top closure with a top opening generally aligned with the inlet opening, said outer housing body enveloping the inner cylindrical liner in spaced relationship to form an evacuated gap between the tubular bodies, the closed bottom closure and the top closure and a circular reinforcing collar surrounding the top opening within which is received and fixedly attached to a mating reinforcing collar surrounding the inlet opening to strengthen the top closures against distortion from net pressure created by evacuation of the evacuated gap.

Thus, the objective is also obtained by providing a method of making an insulated beverage urn by performing the steps of inserting an inner metal liner within an outer metal housing having reinforcing cavities, securing the inner liner within the outer housing in spaced relationship to provide a gap between the inner liner and the outer housing and evacuating the gap.

BRIEF DESCRIPTION OF THE DRAWINGS

The foregoing object and advantageous features of the present invention will be described in detail and other advantageous features will be made apparent from a detailed description of a preferred embodiment of the beverage dispenser of the present invention that is given with reference to the several figures of the drawing, in which:

FIG. 1 is a front elevation view of a vacuum insulated beverage dispenser of the present invention;

FIG. 2 is a side elevation section view of the vacuum insulated beverage dispenser of the present invention taken along section line II-II of FIG. 1;

DETAILED DESCRIPTION

Figure 3:
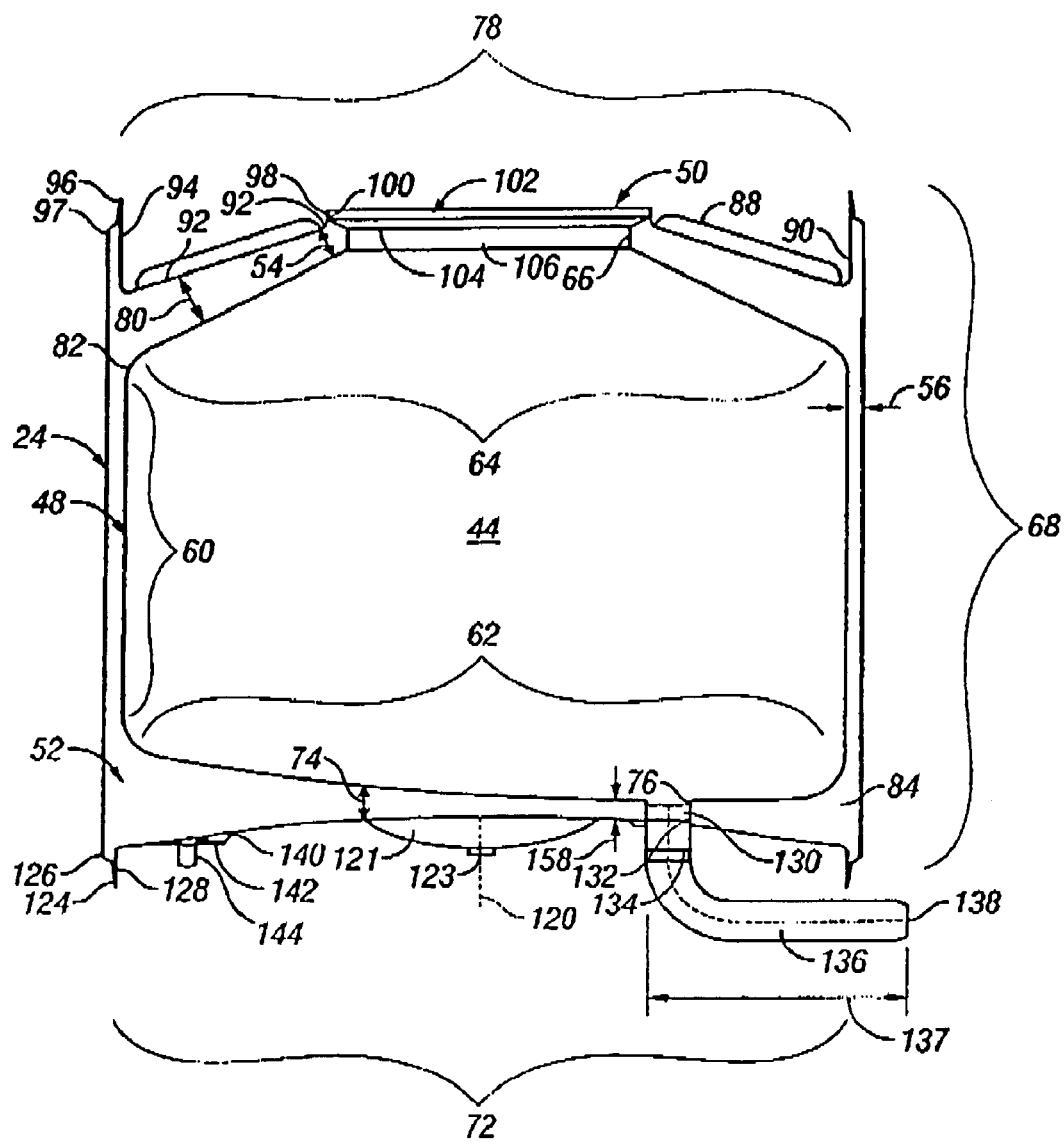
FIG. 3 is a side elevation section view of the vacuum insulated beverage container of the beverage dispenser of FIGS. 1 and 2.

Referring to FIGS. 1 and 2, an embodiment of the vacuum insulated beverage dispenser assembly 10 of the present invention is seen to include a base 12 supporting a cylindrical dispenser body 14 above a support surface 16 such as a counter top or top of a serving cart. The base 12 includes a plastic leg section 18 underlying a rearward portion of the dispenser body 14 and a drip tray assembly 19 extending forwardly of the plastic leg section 18 to provide support against forward tipping of the dispenser body 14 that is cantilevered mounted over the drip tray assembly 19. The drip tray assembly 19 provides a surface beneath a nozzle of a faucet 22 for temporary support of a cup or other serving container during dispensing of the beverage, such as hot coffee. The faucet 20 is connected to the outlet end of a metal dispense tube 22 that is in fluid communication with the interior 44 of the dispenser body 14. The dispense tube 22 extends laterally outwardly from the side of a cylindrical hollow bottom section 25 to connect with and cantilever support the faucet 20 at the front of the bottom section 25. The cylindrical dispenser body 14 includes a vacuum insulated, stainless steel, beverage urn with a stainless steel outer housing 24 that envelopes an inner, stainless steel liner 48. The dispenser body also includes a bottom section 25 secured to the bottom of the outer housing 24 and a top section 30 attached to the top of the outer housing 24. The outer housing 24 and the inner liner 48 are shown in and described in detail with reference to FIGS. 3-8.

Still referring to FIGS. 1 and 2, the hollow, insulating plastic bottom section 25 is attached by threaded fasteners to the bottom 26 of the outer housing 24. The bottom body section 25 in turn is secured the top of the leg section 18 to provide underlying support for the beverage urn 14. The plastic cylindrical top section 30 is attached to a top 32 of the outer housing 24 by fasteners, and carries a funnel assembly 34, a funnel closure member 36 and a visual beverage status display 38. The funnel assembly 34 has an insulating mounting collar 40 surrounding the funnel that fits through a central opening in the top section 30 and through a mating top inlet opening 42 of the outer housing 24 and into the interior 44 of the dispenser body 14. In the case of a hot beverage, a downtube 46 passes the beverage from the funnel to adjacent the bottom of the interior of the dispenser body 24. The down tube may carry level sensing elements. Preferably, the structural parts of the base 18, the bottom section 25 and the top section 30 are made of ABS plastic or other suitable styrene co-polymer. The portion of the top section 30 that touch the beverage, such as the down tube 46, the funnel 34 and the funnel closure member 36 are made of polypropylene or other like plastic material.

Referring now to FIG. 3, a vacuum insulated beverage container, or vacuum insulated beverage dispensing urn, 50 is seen to include an inner liner 48 contained within the outer housing 24. Both the inner liner 48 and the outer housing 24 are preferably made of 300-Series stainless steel, such as 303-stainless steel, having a thickness of approximately 24-gage, plus or minus 10%. It has been found that because of the structural reinforcement elements of the invention this thickness of steel provides sufficient strength to withstand the pressures created by evacuation of the evacuated gap 52 between the inner liner 48 and the outer housing but yet is sufficiently light weight to enable manual manipulation for purposes of moving into and out of brewed beverage receiving position beneath a coffee brewer and to remote serving locations and for purposes of cleaning. The stainless steel vacuum insulated urn 48 does not readily absorb food, etc. and is therefore approved for use with beverages such as milk and juice in addition to use with brewed beverages such as coffee and tea. The evacuated gap 52 is preferably evacuated to approximately 8% of atmospheric pressure or less. The gap 52 is approximately one quarter inch at the thinnest section 54 at the top of the urn 52, approximately one half inch at sections 56 at the sides of the urn and approximately three quarters at the thinnest segment 158 at the bottom of the urn. The hollow body bottom section 25 and the top section 30 with the funnel closure member 36 also help insulate the interior of the urn 50. While stainless steel of this type and thickness has been found suitable for an urn having a diameter of approximately eight to nine inches, for urns of a larger diameter a larger thickness may be required.

Referring to FIG. 3, the inner liner 48 of the urn 50 has a generally tubular, cylindrical, hollow liner body 60, a bottom closure 62 and a top closure 64 with an inlet opening 66 that is aligned directly beneath the top opening 42 and receives the insulating funnel collar 40, FIG. 2. The inlet opening 66 advantageously is sufficiently large to enable manual access to the interior of liner 48. The inner tubular body 60, the top closure 64 and the bottom closure 62 are integrally made of a single piece of molded steel, preferably 300-series stainless steel, preferably 303-stainless steel. The outer housing 24 has a tubular, cylindrical hollow housing body 68 which envelopes the cylindrical liner body 60 of the inner liner 48. A housing bottom closure 72 that is relatively larger than the liner bottom closure 62 closes the bottom of the cylindrical housing body 68 and is spaced from the liner bottom closure 62 to provide a variable bottom gap 74. The thinnest part 158 of the gap 74 is adjacent the lowest part of the liner bottom closure 62 next to an outlet opening 76.

The top closure 78 carries the top opening 42 in a central position that is generally aligned directly above the inlet opening 66 and is spaced from the inner liner top enclosure 64 to define a variable width gap 80. Because the housing top enclosure and bottom enclosure are relatively larger than the liner top closure and the liner bottom closure there are also gaps at the junctures 82 and 84 of the closures with the tubular bodies and all of the gaps are in communication with one another so that there is a continuous evacuated gap surrounding the entire liner. Advantageously, this enables evacuated all of the gaps with a single evacuation process. In any event, the outer housing 24 envelopes the inner cylindrical liner 48 in spaced relationship to form an evacuated gap between each of the tubular bodies, the bottom closures and the top closures.

Referring also to FIG. 3, in accordance with one aspect of the invention, a plurality, preferably at least four, substantially identical inwardly extending reinforcement cavities 86 are formed in the top closure 78 to strengthen the top closure 78 against inward bowing from net pressure created by evacuation of the evacuated gap 52. In accordance with another aspect of the invention, the top housing closure 78 has a plurality, preferably four, substantially identical elongate reinforcement, or stiffening, ribs 88 on the top closure 78. The ribs 88 radiate outwardly from the top opening 42 and toward a surrounding outer edge 90 joined to the outer tubular housing body 24 to strengthen the top closure 78 against inward bowing or other distortion from net pressure created by evacuation of the evacuated gaps.

The top closure 78 has a canted surface top surface 92 that extends outwardly and downwardly from the top opening 42 to the surrounding outer edge 90 that is preferably configured as a truncated cone. The canted top surface 92 is joined at edge 90 to an upturned cylindrical collar 94. The upper end of the upturned collar 94 is joined by a weld to an inwardly extending mounting collar 96 at the top of the outer tubular housing body 68 to help strengthen the top closure 78 against bowing or other distortion from net pressure created by evacuation of the evacuated gaps. The mounting collar 96 is supported in an inward position relative to the outside surface of the cylindrical housing body 68 by a truncated conical shoulder 97 that extends inwardly and upwardly from the top of the cylindrical wall of the body 68 for welded attachment to the inwardly located top of the upturned collar 94. The outwardly canted surface 92 is joined to the upturned mounting collar 94 at a location adjacent to but spaced beneath the mounting collar 96 at top end of the tubular housing body 68 to help strengthen the top closure 78 against bowing or other distortion due to net pressure created by evacuation of the evacuated gap 80 or otherwise. The perimeter mounting collar 94 is attached to the interior surface of the outer housing 24 at a level that is substantially the same as the top opening surrounded by collar 100. This level arrangement enables a snug fit of the top section 30 to the top of the vacuum insulated urn 50. The internally threaded fastener 144 extends above this level for receipt of a mating fastener.

Figure 4:
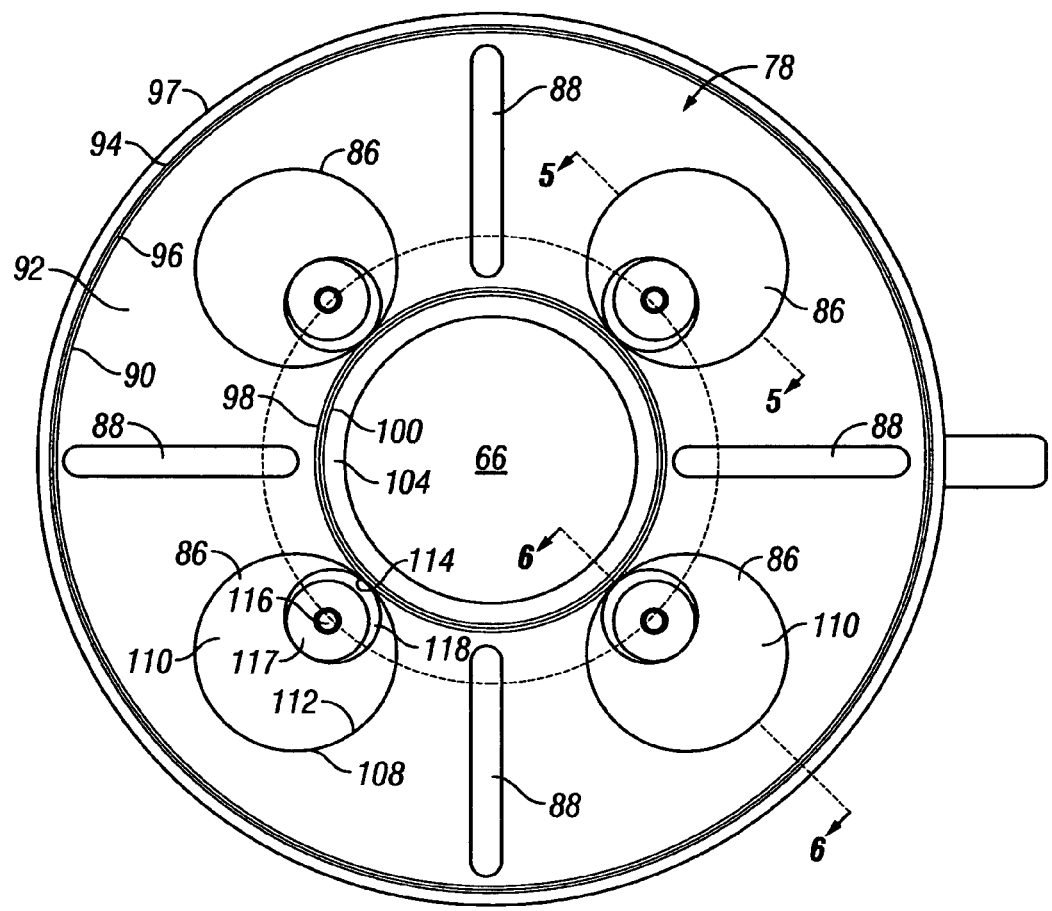
FIG. 4 is a plan view of the top of the vacuum insulated beverage container of FIG. 3.
Figure 5:
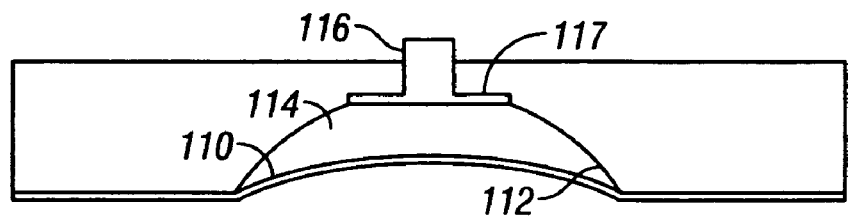
FIG. 5 is a sectional side view of one of the reinforcement cavities taken through section line V-V of FIG. 4.
Figure 6:
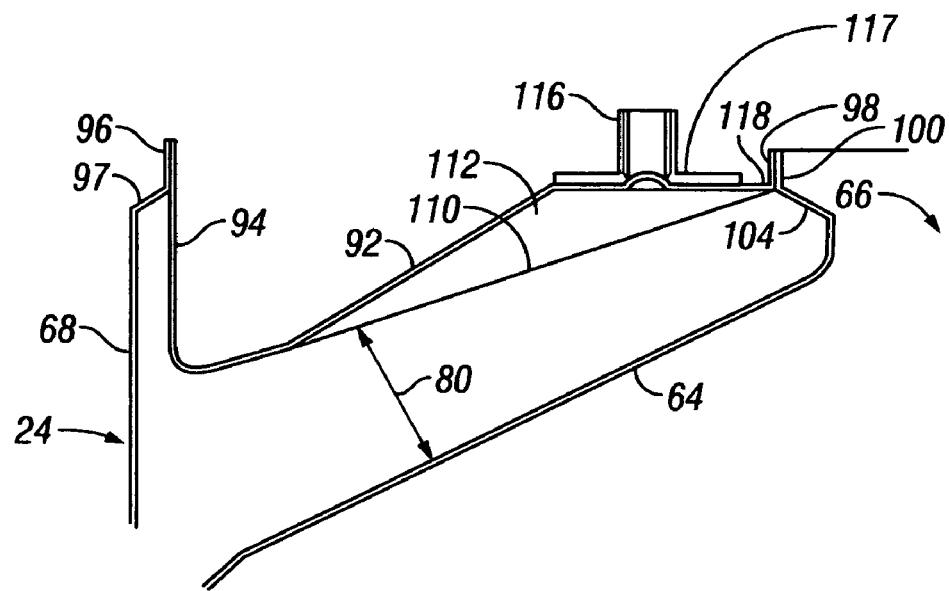
FIG. 6 is a sectional side front view of one of the reinforcement cavities taken through section line VI-VI of FIG. 4.

An upwardly extending cylindrical mounting collar 98 surrounds the top opening 42. Within the mounting collar 98 is received and fixedly attached by weld joint a top cylindrical mounting collar 100 of a collar assembly 102 surrounding the inlet opening 66. The mounting collar 100 is supported above the inlet opening 66 by a truncated conical neck 104 with a relatively narrow opening connected to the top of a reinforcing collar 106. The bottom of the reinforcing collar 104 snugly surrounds and strengthens the inlet opening 66. A relatively wider diameter of the mounting collar provides space for a resilient sealing member (not shown) that is seated upon the conical surface of the conical neck 104 and has an interior diameter substantially the same as the inlet opening 66 and the reinforcing collar 106. This seal member (not shown) seals the outside insulating funnel collar 40 against the escape of heat air and steam from the interior 44. The top of the upturned, inwardly mounting collar 94 and the top of the inwardly extended mounting collar 96 are both at substantially the same level as the top of the seal ring mounting collar 102. This enables a level fit of the top section 30 on top of the outer housing 24, as shown in FIG. 2. A fastener 116 extends above this level for connection with a mating fastener As seen in FIG. 4, and also referring to FIGS. 5 and 6, the reinforcement cavities 86 are formed adjacent the inlet opening 66 and abut the mounting collar 98 and radiate from the center across most of the canted surface 92. The each one of the reinforcement cavities is at least partly arcuate, with a substantially circular, but slightly elliptical or egg-shaped, perimeter edges 108 at the top of the canted surface 92. The cavities have upwardly curved, downwardly slanted bottoms 110 and side surfaces 112 that extend downwardly to meet the bottom surfaces 110, as shown by FIGS. 5 and 6, and have a circular, elliptical or parabolic shapes. Adjacent the top opening 66 is located a generally vertical, or other upwardly extending, reinforcement wall 114, or a slanted or curved wall with a substantial vertical component. Of course, all of the sidewalls 112 above the lowest surface of the cavity 86 have a vertical component and supplement the stiffening provided to the top closure 78 by the reinforcement wall 114 against inward pressure forces due to gap evacuation and other forces with a vertical direction.

Figure 7:
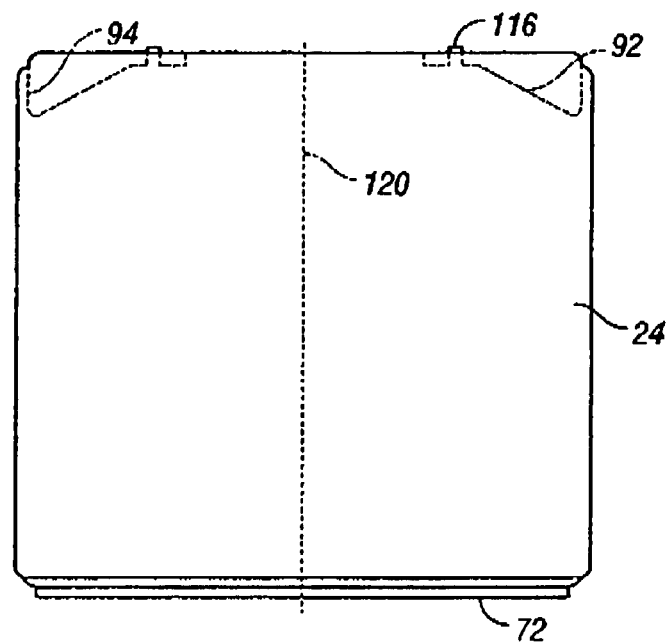
FIG. 7 is a sectional side view of one of the reinforcement cavities of FIG. 4.

The upstanding fastener 116, such as an internally threaded stud, 116 mounted on a spot welded base 117 extends vertically upwardly from an upwardly facing, substantially horizontal, surface 118 of the base 117 adjacent the top opening 66 and elevated above the bottom of the arcuate surface 110 of each of the reinforcement cavities 86. The fasteners 116 extend upwardly above the top of the tap of the urn 50, to a position outside of the top of the cavity, as shown in FIG. 7, for attachment with the top cover 30 overlying the top closure 78 by means of mating Fasteners, such as externally threaded bolts. The upwardly facing surface is substantially flat, circular and tangent to the wall 114 and the innermost edge of the perimeter 108, adjacent the inlet opening 66. As seen in FIG. 6, the arcuate convex surface 110 extends downwardly and away from the upward facing, substantially flat surface 118. Each fastener 116 extends upwardly to a location outside of the cavity 86 from which the fastener 116 extends. The fastener base 117 is integrally formed with the threaded fastener and the fastener base 117 is spot-welded to the upwardly facing surface 118.

As best seen in FIG. 4, the plurality of reinforcement cavities 86 are equally distributed around the inlet opening 66 of the outer housing 24. Preferably, there are at least four reinforcement cavities surrounding the inlet opening although a lesser number may be adequate. Preferably the number of elongate ribs 88 on the top closure 78 is equal to the number of reinforcement cavities 86 so that one rib may be located equidistant between each pair of adjacent reinforcement cavities. The plurality of ribs 86 are integrally formed in the top closure 78 such as by molding and preferably extend upwardly from the surrounding canted surface 92 of the ribs 88. The ribs 88 extend, and preferably radiate, outwardly between the inlet opening 66 and the outer perimeter or edge 90, and are adjacent with the collar 98, but are not contiguous with either the collar 98, like are the reinforcement cavities 86, or with the edge 90. Instead, the opposite ends of the reinforcing ribs are equally spaced from the collar 98 and the edge 90 by an approximate amount shown in FIG. 4.

The tubular body 68 has a center axis of symmetry 120, and the canted surface 92 forms an angle with the axis of symmetry of approximately seventy degrees. The canting and associated mounting elements strengthen the surface against flexing and distortion from outside pressures pressing inwardly against the top closure 78. The ribs 88 being parallel to the surface 92 and being of uniform thickness are slanted by the same degree as that of the canted surface 92. Alternatively, the ribs may be thicken closer to the edge 90 in which case the top surfaces may be slanted at an angle less than that of the canted surface 92. While the canted surface 92 is preferably has the shape of a truncated cone outwardly curved surface may also function to strengthen the top closure against inward bowing.

Referring to FIG. 3, again, the top closure 64 of the inner liner 48 is also canted downwardly and outwardly like the canted surface 92 but at a steeper angle. Preferably, the slant or angle of the top closure 64 of the inner liner 48 forms a nonzero, acute angle with the canted surface 92 of the top closure 78 of the outer housing 24. The acute angle is approximately ten degrees and is no less than approximately eight degrees. This canting of the top closure 64, which is approximately sixty degrees relative to vertical enables condensation formed on the inside of the top closure 64 to slide down the interior of the canted surface of the top closure 64 and onto the interior cylindrical walls of the body 60. This also eliminates sharp corners and facilitates manual access to the interior of the top closure 64 through the opening 66. Thus, both of the top closures 78 and 64 are reinforced against distortion by their conical or canted configurations and by the doubled wall construction with welds at the collar assembly 102 and the upturned collar 94.

Figure 8:
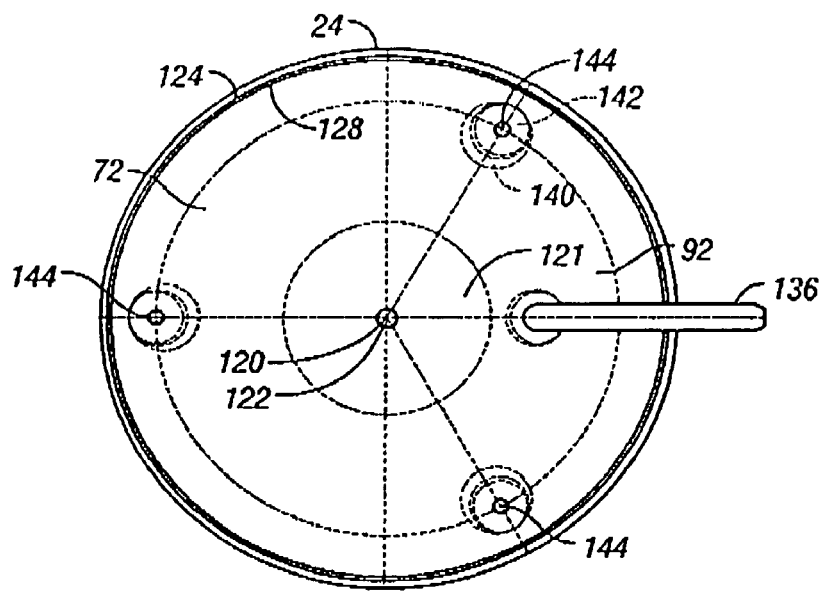
FIG. 8 is a bottom view of the vacuum insulated beverage container of FIG. 3.

Still referring to FIG. 8 and also still to FIG. 3, the housing bottom closure 72 is generally inwardly concave to help strengthen the bottom closure 72 against inward bowing from net pressure created by evacuation of the evacuated gap 52. A central dome-like portion 121 has a closed evacuation opening 122 through which air is evacuated from the gap 52 to help strengthen the bottom closure against inward bowing. After the evacuation process has reached the desired the level the opening is closed by being pinched closed and then braised, or welded, and then capped with epoxy cement plug 123.

The bottom of outer housing 24 has an inwardly located and downwardly extending mounting collar 124 supported at the end of an inwardly extending conical neck 126. The mounting collar is welded to a downwardly extending matching mounting collar 128 at the periphery of the bottom closure 72. The drain hole, or outlet opening 76 is located at the lowest part of the bottom closure 62 of the inner liner, and as best seen in FIG. 3, the outlet opening 76 is located at a position that is offset from the center axis 120 by a substantial amount. An outlet pipe stub 130 is welded at one end to a downwardly extending collar surrounding the outlet opening 76 and is received within and welded to a downwardly extending collar surrounding an aligned outlet opening 132 in the housing bottom closure 72. An L-shaped dispense tube 136 is then fastened to a distal end 134 of the stub 130 that is approximately aligned with the bottom of mounting collar 128. The L-shaped dispense tube 136 extends radially outwardly from beneath the aligned outlet openings 76 and 132 and the end 134 to a location spaced laterally from the housing body 24 to a distal end 138. The end passes through an opening in the front of the bottom section 25, as seen in FIG. 2, for releasable connection with the faucet assembly 20. The base 25 provides some insulation for the beverage in the dispense tube 136 and the stub 130, but since the stub 130 and the dispense tube are both made of metal, preferably stainless steel, as noted above, for purposes of cleanliness, strength and durability, they are also highly heat conductive. Because the outlet openings are spaced from the center 120 the lateral run 137 of the L-shaped tube 136 is shorter than it would be if the drain were in the center, and thus there is less heat loss than if the lateral run had to extend all the way to the center as in known beverage dispensers. The lateral section of the L-shaped dispense tube 136 radiates to the front of the housing tubular body 24 which is the closest side to the outlet openings 76 and 132. The interior surface of the bottom closure 62 of the inner liner 48 slopes asymmetrically downward to a the lowest level adjacent to the drain outlet opening 76 to facilitate complete draining without the formation of puddles of beverage on the bottom. All sharp corners are avoided in the configuration of the inner liner 48 to facilitate draining and cleaning with rounded corners between the top closure and the bottom closure with the cylindrical body 60 of the inner liner 48.

Referring to FIG. 8 and FIG. 3, the outside of the bottom closure has a plurality, preferably three, equally spaced generally flat, horizontal fastener mounting surfaces 140 adjacent the perimeter to which are spot welded bases 142 that space downwardly extending threaded fasteners 144. These fasteners 144 are used to releasably attach the bottom section 25 to the bottom closure 72.

The beverage dispenser 10 is constructed by first assembling the evacuated urn 50 and then attaching the top section 30 and the bottom section 25 to the urn 50 using the fasteners 144 at these locations. Then the bottom section 25 is mounted to the base 12.

The inner liner 48 is preferably made of a single piece of cast metal, preferably 303-stainless steel having a thickness of approximately one-quarter inch. The stub 130 is welded in place to the inner liner as shown in FIG. 3. The mating collar 96 is welded to the top of the upstanding member 94 to attach the top closure member 78 to the top of the tubular body 68. This subassembly is then lowered over the top of the inner liner 48, aligned and positioned with the collar 100 of the inner liner 48 fitted within the opening surrounding mounting collar 96 of the top closure 78 of the outer housing 24. The mounting collars 98 and 100 are then welded together. The bottom closure member is then fitted to the bottom of the tubular body 68 with the mounting collar 126 of the bottom closure 72 received within the opening surrounded by the mounting collar 124 of the outer housing 24 and the stub received through the mounting collar 132. The mounting collars 124 and 128 are welded together and the mounting collar 132 is welded to the side of the stub 130. All of these welds hold the inner liner 48 in spaced relationship from the housing 24 to provide the gap 52 as shown in FIG. 3. An evacuation pump is then connected to a collared hole at the bottom of the central convex section 121 of the bottom closure 72 shown closed by plug 123. After the evacuation is complete, the hole is closed with a weld and an epoxy plug 123. The gap 52 is preferably evacuated to no more than approximately 8% of standard atmospheric pressure. The L-shaped dispense tube 136 is then welded to the distal end 134 of the stub 130. The bottom section 25 and the top section 30 are attached to the bottom closure 72 and the top closure 78 using the associated fasteners. The bottom section 25 is then attached to the top of the leg section 18 of the base 12. AU welds use stainless steel rod.

While a particular embodiment of the beverage dispenser has been disclosed in detail, it should be appreciated that many changes may be made and equivalents substituted for some of the elements without departing from the scope of the invention as defined in the appended claims. For instance, while the use of stainless steel for all of elements of the vacuum insulated urn 50 is preferred, other metals that do not interact with coffee like beverages could also be used, such as titanium alloys. With the use of only stainless steel the urn 50 is stronger than one with a glass liner and because of the elimination of corners, a sloped bottom and a clear drain pipe also made of stainless steel, the urn 50 is suitable to use for dispensing beverages such as milk and juice. If such use is not contemplated, then even air impermeable plastic material may be used for the urn material. While particular shapes have been illustrated for the reinforcement cavities, it is believed that other shapes could be used with equal effect. Reference should therefore be made to the claims to determine the scope of the invention.

The invention claimed is:

1. A vacuum insulated beverage dispenser, comprising:
   an inner liner with a generally hollow cylindrical liner body, a closed bottom closure and a top closure with an inlet opening;
   a single-piece outer housing with a hollow cylindrical housing body with a housing top, said outer housing enveloping the hollow cylindrical body of the inner liner, a relatively larger closed bottom closure and a relatively larger top closure with a housing top opening generally aligned with the inlet opening, said outer housing body enveloping the inner hollow cylindrical liner body in spaced relationship to form an evacuated gap between the hollow cylindrical bodies, the closed bottom closures and the top closures; and
   a slanted surface of said relatively larger top closure of the outer housing body extending downwardly and outwardly from the top opening of the outer housing to a surrounding outer edge of the surface joined to the hollow cylindrical housing body at a location adjacent to but spaced beneath the top end of the hollow cylindrical housing body to strengthen the relatively larger top closure against distortion from net pressure created by evacuation of the evacuated gap.

2. The beverage dispenser of claim 1 in which the surface of the top closure of the inner liner is slanted outwardly and downwardly at a substantially fixed angle from the top opening to the hollow cylindrical body of the inner liner.

3. A vacuum insulated beverage dispenser, comprising:
an inner liner with a generally tubular liner body, a closed bottom closure and a top closure with an inlet opening;
a single-piece outer housing with a tubular housing body that envelopes the tubular body of the inner liner, a relatively larger closed bottom closure and a relatively larger top closure with a housing top opening generally aligned with the inlet opening, said outer housing body enveloping the inner cylindrical liner in spaced relationship to form an evacuated gap between the tubular bodies, the closed bottom closures and the top closures; and
a surface of said top closure of the outer housing body extending between the top opening of the outer housing to a surrounding outer edge of the surface joined to the tubular housing body at a location adjacent to but spaced beneath the top end of the tubular housing body to strengthen the top closures against distortion from net pressure created by evacuation of the evacuated gap and including ribs formed in the surface of the top closure of the outer housing and extending between the top opening and the tubular housing body.

4. A vacuum insulated beverage dispenser, comprising:
an inner liner with a generally tubular liner body, a closed bottom closure and a top closure with an inlet opening;
a single-piece outer housing with a tubular housing body that envelopes the tubular body of the inner liner, a relatively larger closed bottom closure and a relatively larger top closure with a housing top opening generally aligned with the inlet opening, said outer housing body enveloping the inner cylindrical liner in spaced relationship to form an evacuated gap between the tubular bodies, the closed bottom closures and the top closures; and
a surface of said top closure of the outer housing body extending between the top opening of the outer housing to a surrounding outer edge of the surface joined to the tubular housing body at a location adjacent to but spaced beneath the top end of the tubular housing body to strengthen the top closures against distortion from net pressure created by evacuation of the evacuated gap and in which the surface of the top closure of the outer body has a plurality of reinforcement cavities.

5. The beverage dispenser of claim 1 in which the top closure has an outer perimeter with a collar that is fixedly attached to an interior surface of the outer housing adjacent a top of the outer housing.

6. The beverage dispenser of claim 5 in which the perimeter collar is upturned from an outer edge of the slanted surface and is welded to the hollow cylindrical housing body.

7. The beverage dispenser of claim 1 in which the top closure of the inner liner has a collar surrounding the inlet opening and the top closure of the outer housing has a collar surrounding the inlet opening to which the collar of the inlet opening is welded.

8. An insulated beverage dispenser, comprising:
an inner liner with a generally hollow cylindrical liner body, a bottom closure and a top closure with an inlet opening;
a single-piece outer housing with a hollow cylindrical housing body that envelopes the hollow cylindrical body of the inner liner, a relatively larger closed bottom closure and a relatively larger top closure with a top opening generally aligned with the inlet opening, said outer housing body enveloping the inner hollow cylindrical liner body in spaced relationship to form an evacuated gap between the tubular bodies, the closed bottom closures and the top closures;
a slanted surface of said relatively larger top closure of the outer housing body extending downwardly and outwardly from the top opening of the outer housing to a surrounding outer edge of the surface joined to the hollow cylindrical housing body at a location adjacent to but spaced beneath the top end of the hollow cylindrical housing body to strengthen the relatively larger top closure against distortion from net pressure created by evacuation of the evacuated gap;
a circular reinforcing collar surrounding the top opening within which is received and fixedly attached a mating reinforcing collar surrounding the inlet opening to strengthen the top closure against distortion from net pressure created by evacuation of the evacuated gap; and
an upstanding neck surrounding and extending upwardly from the inlet opening to support the mating reinforcing collar above an upper closed surface of the top closure of the inner liner.

9. The insulated beverage dispenser of claim 8 in which the reinforcing collar and the mating reinforcing collar are welded together.

10. The insulating beverage dispenser of claim 8 in which the upstanding neck has a funnel shaped section spaced from the inlet opening and the mating reinforcing collar.

11. The insulating beverage dispenser of claim 8 in which the top closure of the outer housing has a generally truncated conical shape.

12. The insulating beverage dispenser of claim 11 in which the top closure of the inner liner has a generally truncated conical shape.

\* \* \* \* \*